(12) United States Patent
Sims

(10) Patent No.: US 10,348,067 B1
(45) Date of Patent: Jul. 9, 2019

(54) PRESSURE RELIEF MECHANISMS FOR GAS INSULATED SWITCHGEAR (GIS) HOUSINGS AND RELATED GIS HOUSINGS

(71) Applicant: Eaton Intelligent Power Limited, Dublin (IE)

(72) Inventor: Daniel Garett Sims, Newberry, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/938,488

(22) Filed: Mar. 28, 2018

(51) Int. Cl.
| | |
|---|---|
| *H02B 13/025* | (2006.01) |
| *H02B 13/045* | (2006.01) |
| *F16K 17/36* | (2006.01) |

(52) U.S. Cl.
CPC ......... *H02B 13/025* (2013.01); *H02B 13/045* (2013.01); *F16K 17/36* (2013.01)

(58) Field of Classification Search
USPC .................. 361/604, 612, 618; 218/155–157
See application file for complete search history.

(56) References Cited

U.S. PATENT DOCUMENTS

| | | | |
|---|---|---|---|
| 9,121,517 B2 * | 9/2015 | Kim ........................ | F16K 13/04 |
| 2009/0314356 A1 * | 12/2009 | Osumi ................. | H02B 13/065 |
| | | | 137/68.23 |

* cited by examiner

*Primary Examiner* — Zachary Pape
(74) *Attorney, Agent, or Firm* — Stanek Lemon Crouse & Meeks, PA

(57) ABSTRACT

Housings for gas in a gas insulated switchgear (GIS) system is provided. The housing includes a pressure relief mechanism incorporated into the housing. The pressure relief mechanism includes a portion of the housing having a first thickness, different from a second thickness of a remaining portion of the housing, the first thickness being less than the second thickness. The pressure relief mechanism is configured to rupture at predetermined overpressure conditions to vent bi-products of an arc fault in the GIS system.

18 Claims, 3 Drawing Sheets x = PREDETERMINED THICKNESS OF RUPTURE AREA
y = TYPICAL THICKNESS OF WALL x = PREDETERMINED THICKNESS OF RUPTURE AREA
y = TYPICAL THICKNESS OF WALL x = PREDETERMINED THICKNESS OF RUPTURE AREA
y = TYPICAL THICKNESS OF WALL

PRESSURE RELIEF MECHANISMS FOR GAS INSULATED SWITCHGEAR (GIS) HOUSINGS AND RELATED GIS HOUSINGS

FIELD

The inventive concept relates generally to power devices and, more particularly, to gas insulated switchgear (GIS).

BACKGROUND

In an electric power system, switchgear is the combination of, for example, electrical disconnect switches, fuses or circuit breakers used to control, protect and isolate electrical equipment. Switchgear can be used both to de-energize equipment to allow work to be done and to clear faults downstream. There are different types of switchgear.

In particular, switchgear may be a simple open-air isolator switch or it may be insulated by some other substance. An effective, although more costly, form of switchgear is the gas-insulated switchgear (GIS), where the conductors and contacts are insulated by pressurized gas, for example, sulfur hexafluoride gas ($SF_6$). Other common types of switchgear are oil or vacuum insulated switchgear. The combination of equipment within the switchgear enclosure allows them to interrupt fault currents of thousands of amps.

Gas-insulated switchgear (GIS) generally handles medium to high voltages, for example, from 1 kV to 52 kV for medium-voltage classifications, and from 52 kV to 1200 kV for high voltage classifications. Gas-insulated switchgear (GIS) is a compact metal encapsulated switchgear consisting of components such as circuit-breakers and disconnectors, which can be safely operated in confined spaces.

Like all switchgear, GIS typically includes a mechanism for relieving overpressure generated by arcing faults. Conventional methods for relieving overpressure include, for example, bolt-on burst discs and rupture plates.

SUMMARY

Figure 1A:
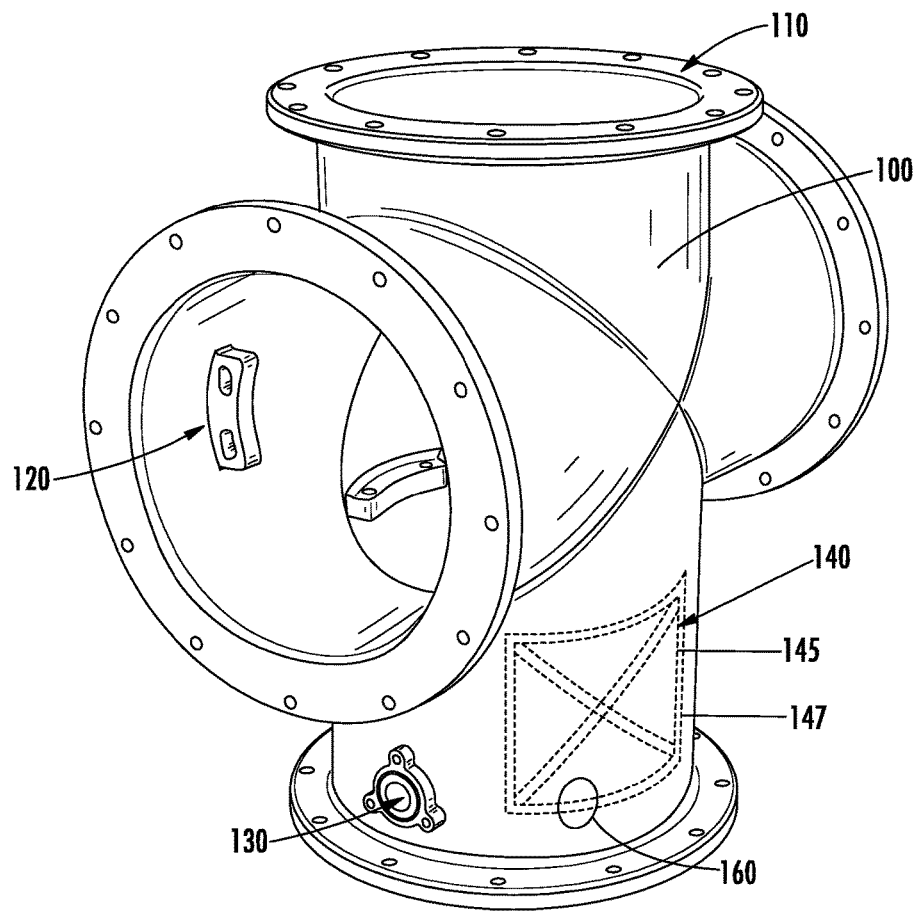
FIG. 1A is a diagram illustrating a housing including pressure relief mechanism in accordance with some embodiments of the present inventive concept.

Some embodiments of the present inventive concept provide a housing for gas in a gas insulated switchgear (GIS) system; the housing includes a pressure relief mechanism incorporated into the housing. The pressure relief mechanism includes a portion of the housing having a first thickness, different from a second thickness of a remaining portion of the housing, the first thickness being less than the second thickness. The pressure relief mechanism is configured to rupture at predetermined overpressure conditions to vent bi-products of an arc fault in the GIS system.

In further embodiments, the pressure relief mechanism may include a groove having the first thickness that defines an area of the housing. The area of the housing defined by the groove may be configured to fail responsive to the predetermined overpressure conditions.

In still further embodiments, the pressure relief mechanism may include a defined area having the first thickness. The defined area may be configured to fail responsive to the predetermined overpressure conditions.

In some embodiments, the housing may include a cast metal housing.

In further embodiments, the pressure relief mechanism may be integrated with housing such that the pressure relief mechanism is not installed onto or into the housing.

In still further embodiments, the pressure relief mechanism may be integrated directly into walls of the housing by incorporating a geometry of the pressure relief mechanism into a casting itself.

In some embodiments, the pressure relief mechanism may be present on one of an interior and an exterior of the housing.

Further embodiments of the present inventive concept provide pressure relief mechanisms for a housing of a gas-filled switchgear in a gas insulated switchgear (GIS) system. The pressure relief mechanism includes a portion of the housing having a first thickness, different from a second thickness of a remaining portion of the housing, the first thickness being less than the second thickness and is configured to rupture at predetermined overpressure conditions to vent bi-products of an arc fault in the GIS system.

Still further embodiments of the present inventive concept provided gas insulated switchgear (GIS) comprising a gas filled housing including a pressure relief mechanism incorporated into the housing. The pressure relief mechanism includes a portion of the housing having a first thickness, different from a second thickness of a remaining portion of the housing, the first thickness being less than the second thickness. The pressure relief mechanism is configured to rupture at predetermined overpressure conditions to vent bi-products of an arc fault in a GIS system.

DETAILED DESCRIPTION

Specific exemplary embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, conventional methods for relieving overpressure generated by arcing faults in gas-filled switchgear housings may involve, for example, the use of bolt-on burst discs or rupture plates. These types of pressure relief devices generally require additional sealing and may create areas for possible gas leakage from the housing. Bolt-on pressure relief components can also be expensive and can add significant cost to a housing assembly. Aside from component cost, additional labor costs are also associated with the installation of these bolt-on pressure relief devices. Accordingly, some embodiments of the present inventive concept provide pressure relief mechanisms integrated directly into the housing walls by incorporating the geometry into the casting itself as will be discussed further below with respect to FIGS. 1A through 3C.

Referring first to FIG. 1A, a gas-filled switchgear housing in accordance with some embodiments of the present inventive concept will be discussed. As illustrated in FIG. 1A, a gas-filled switchgear housing 100 of a gas insulated switchgear (GIS) typically includes, for example, features such as gas-tight seals and fittings 110, bus support fastening locations 120, structural ribbing, and sealed mechanism penetration points 130. In some embodiments, the housing 100 may be a cast metal housing 100 made of, for example, aluminum, and the bus support 120 may be integrated within the housing 100. It will be understood that more features may be present on the housing 100 without departing from the scope of the present inventive concept and that the figures provided herein are provided for example only. For example, although embodiments of the present inventive concept are discussed with respect to cast metal housings, however, other suitable materials and types of housings may be used without departing from the scope of the present inventive concept.

Referring again to FIG. 1A, in accordance with embodiments discussed herein, the housing 100 includes a pressure relief mechanism 140. In embodiments illustrated in FIG. 1A, the pressure relief mechanism 140 has a rectangular shape and is configured to rupture under certain overpressure conditions.

Figure 1B:
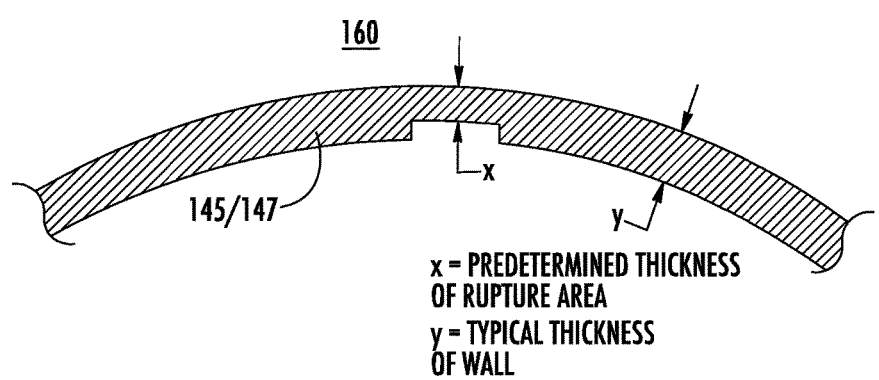
FIG. 1B is a diagram illustrating an enlarged diagram of the pressure relief mechanism of the housing in FIG. 1A in accordance with some embodiments of the present inventive concept.

In particular, GIS systems may experience an arc fault or a high power discharge of electricity between two or more conductors, or between one or more conductors and grounded (earthed) components. One of the main effects of internal arcs is the dynamic pressure stress on mechanical parts of the switchgear. To avoid damage to critical structural components of the switchgear enclosure, an overpressure relief system is typically present in the switchgear. The pressure relief mechanism 140 in accordance with embodiments discussed herein provide an overpressure relief mechanism. For example, the rectangular mechanism 140 illustrated in FIG. 1A may be configured to have thinner walls than the remaining portions of the housing 100 and the perimeter of the surface area of the rectangle may be configured to give way, fail or blow out under overpressure conditions. In other words, the perimeter of the rectangular mechanism may form a groove having a thinner wall than the remaining portion of the housing. FIG. 1B illustrates an enlarged diagram 160 of the groove portion of the perimeter of the rectangular mechanism 140. As illustrated therein, the groove may have a first thickness X and the remaining portion of the housing may have a second thickness Y, which is larger than and different than the first thickness X. The first thickness X may be selected to blow out at a particular overpressure condition. The remaining portions of the housing 100 may have a typical second thickness Y. The pressure relief mechanism in accordance with embodiments discussed herein may be designed not to interfere with the function of these existing common features. Furthermore, the groove may be provided on the interior or the exterior of the housing 100 without departing from the present inventive concept.

The integrated pressure relief mechanism 140 illustrated in FIG. 1A includes a thin-walled fracture groove 145 molded or machined into the casting wall to achieve pressure relief under overpressure conditions. In some embodiments, the fracture groove 145 may run along the perimeter of the fracture mechanism 140 and is configured to blow out under overpressure conditions. As further illustrated in FIG. 1A, additional fracture grooves 147 could also span the cross-section of the blow out area. Although the additional fracture grooves 147 are show as an "X" shape, embodiments of the present inventive concept are not limited thereto. For example, in some embodiments a second rectangular groove may be provided inside the walls of the first rectangular groove 145. The thickness X of the fracture groove 145/147 in relation to the typical wall thickness Y may be determined through materials stress analysis and preliminary validation testing to yield at a specified overpressure value.

Figure 2A:
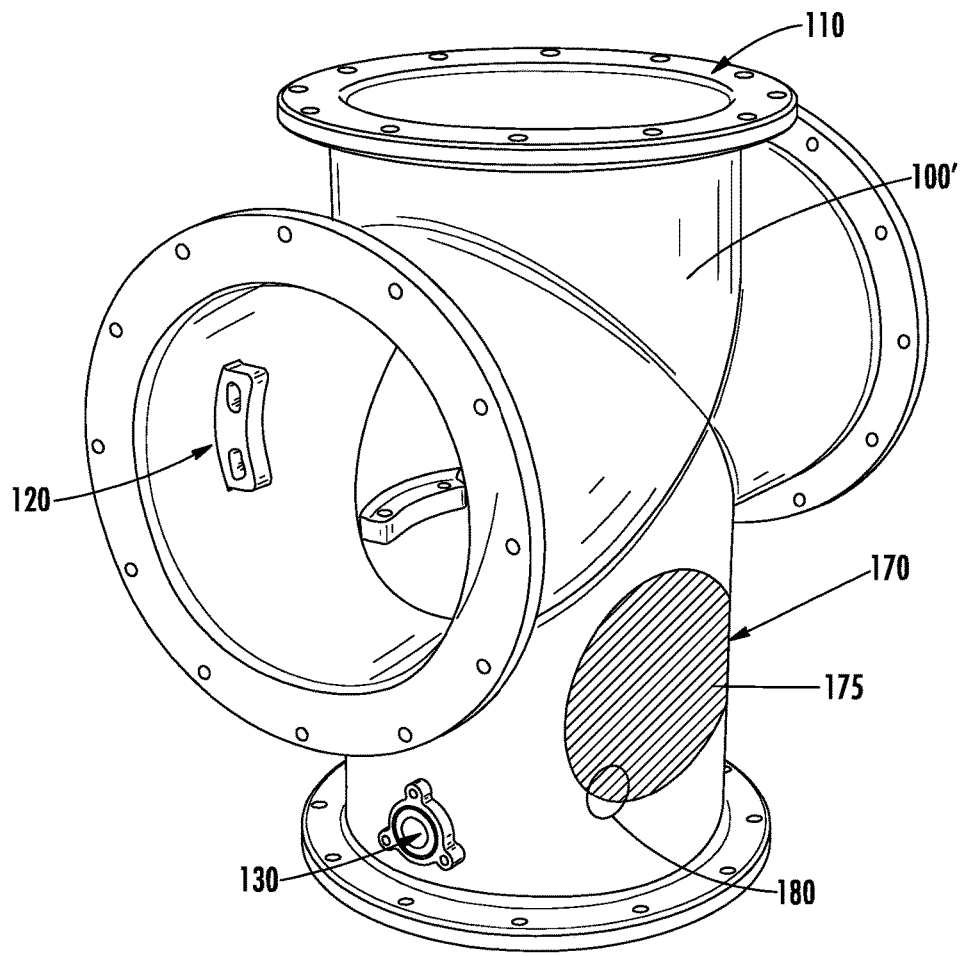
FIG. 2A is a diagram illustrating a housing including pressure relief mechanism in accordance with some embodiments of the present inventive concept.
Figure 2B:
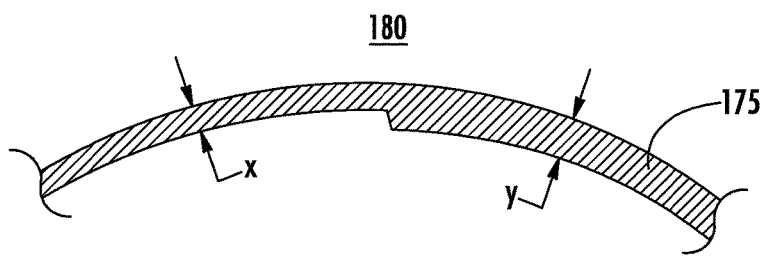
FIG. 2B is a diagram illustrating an enlarged diagram of the pressure relief mechanism of the housing in FIG. 2A in accordance with some embodiments of the present inventive concept.

Referring now to FIGS. 2A and 2B, embodiments of the gas filled switchgear housing 100' in accordance with embodiments of the present inventive concept will be discussed. Like reference numerals refer to like elements throughout the specification. Accordingly, details of like elements may not be repeated in the interest of brevity. Embodiments of the present inventive concept illustrated in FIGS. 2A and 2B are similar to those discussed above with respect to FIGS. 1A and 1B, however, the pressure relief mechanism 170 including a thin-walled rupture area 175 molded into the casting wall to provide pressure relief in overpressure conditions is not rectangular, but oval or circular and does not consist of a groove as discussed above with respect to FIG. 1A. Although the rupture area 175 in FIG. 2A is shown as circular, embodiments of the present inventive concept are not limited this configuration. The rupture area 175 may have any shape without departing from embodiments of the present inventive concept.

In particular, the entire rupture area 170 would have a reduced uniform thickness and would be configured to blow out under overpressure conditions. In some embodiments, the rupture area could conform to the profile of the casting wall (basically invisible from the exterior), have a more convex, or other predetermined, shape to increase internal surface area if needed. FIG. 2B illustrates an enlarged diagram 180 of the rupture area 170 of the pressure relief mechanism 170. As illustrated in FIG. 2B, a thickness of the rupture area X would be smaller than a thickness of the remaining housing Y. The thickness of the rupture area X in relation to the typical wall thickness Y can be determined through materials stress analysis and preliminary validation testing to yield at a specified overpressure value. The rupture area 175 may be provided on the interior or exterior of the housing 100' without departing from the scope of the present inventive concept.

Figure 3A:
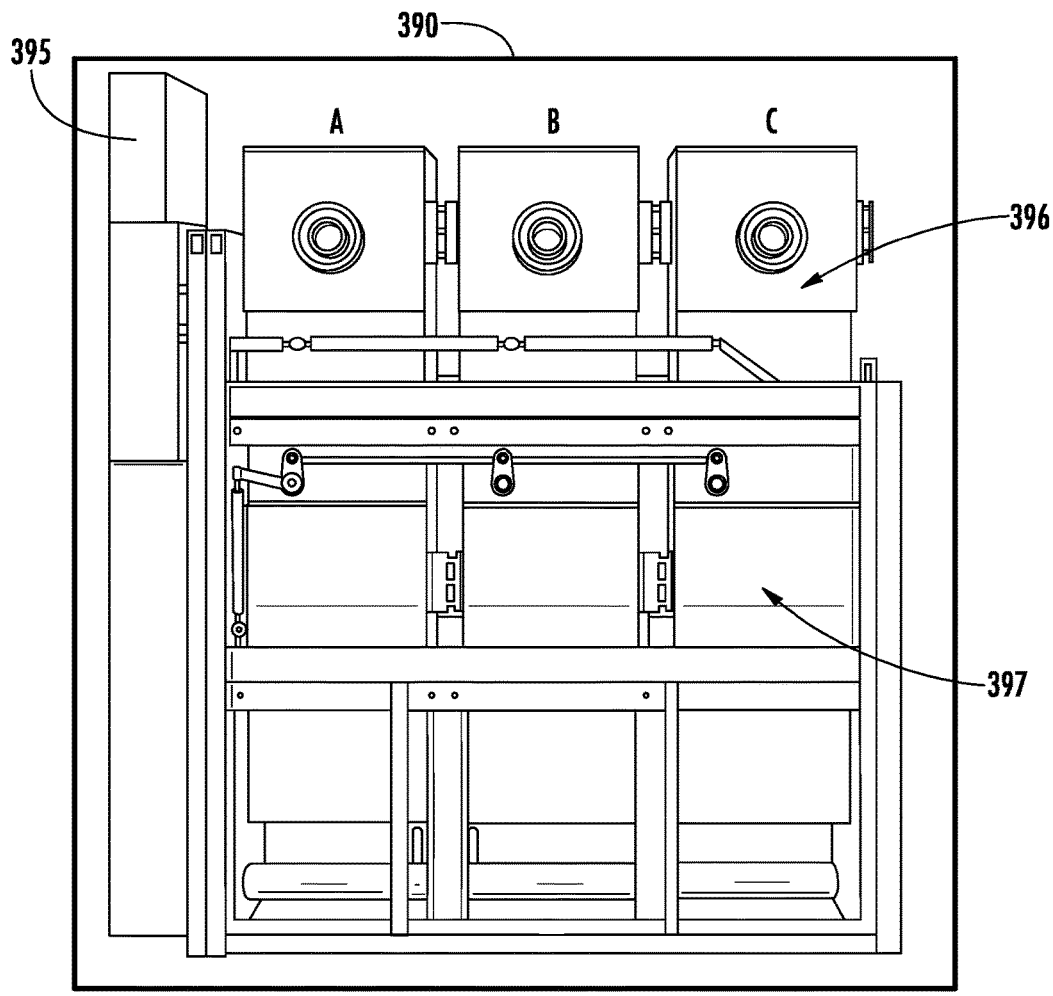
FIG. 3A is a diagram of a side view of a gas insulated switchgear (GIS) panel in accordance to some embodiments of the present inventive concept.
Figure 3B:
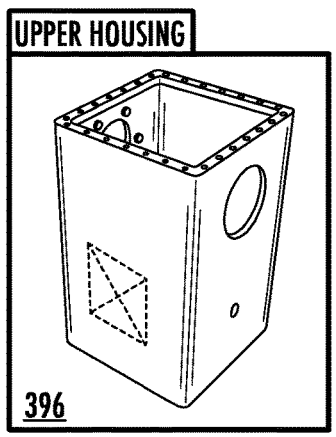
FIGS. 3B and 3C are diagrams of housings including pressure relief mechanisms in accordance with various embodiments of the present inventive concept.
Figure 3C:
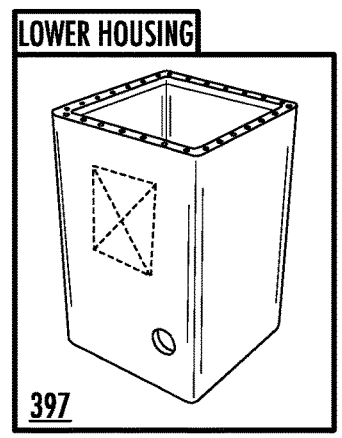

Referring now to FIGS. 3A through 3C, further embodiments of gas filled housings including a pressure relief mechanism in accordance with some embodiments of the present inventive concept will be discussed. In particular, FIG. 3A is a diagram of a side view of an example of a three phase GIS panel 390. The GIS panel 390 is provided in a housing 395, for example, a cast aluminum housing. As illustrated in FIG. 3A, three isolated phases A, B and C are provided in the housing 395. As illustrated in FIGS. 3B and 3C, gas filled switchgear housings 396 and 397 may be provided in the upper housing and lower housing, respectively. The housings 396 and 397 may both include a pressure relief mechanism 140, 170 in accordance with some embodiments of the present inventive concept. As illustrated in FIGS. 3B and 3C, the gas filled housings 396 and 397 are illustrated as having a rectangular or box shape in contrast to embodiments illustrated in FIGS. 1A and 2A, however, it will be understood that gas filled housing may have any shape consistent with details discussed herein without departing from the scope of the present inventive concept.

As discussed above, some embodiments of the present inventive concept provide for the integration of arc pressure relief mechanisms into housings, for example, cast metal housings, utilized in GIS products. These integrated pressure relief mechanisms may function in a similar manner to conventional mechanisms, such as bolt-on burst disc or rupture plate components, but may do away with a need for additional parts, labor and costs associated with these conventional methods.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed is:

1. A housing for gas in a gas insulated switchgear (GIS) system, the housing comprising a pressure relief mechanism incorporated into the housing,
   wherein the pressure relief mechanism includes a portion of the housing having a first thickness, different from a second thickness of a remaining portion of the housing, the first thickness being less than the second thickness; and
   wherein the pressure relief mechanism is configured to rupture at predetermined overpressure conditions to vent bi-products of an arc fault in the GIS system.

2. The housing of claim 1, wherein the pressure relief mechanism comprises a groove having the first thickness that defines an area of the housing, the area of the housing defined by the groove configured to fail responsive to the predetermined overpressure conditions.

3. The housing of claim 1, wherein the pressure relief mechanism comprises a defined area having the first thickness, the defined area being configured to fail responsive to the predetermined overpressure conditions.

4. The housing of claim 1, wherein the housing comprises a cast metal housing.

5. The housing of claim 1, wherein the pressure relief mechanism is integrated with the housing such that the pressure relief mechanism is not installed onto or into the housing.

6. The housing of claim 1, wherein the pressure relief mechanism is integrated directly into walls of the housing by incorporating a geometry of the pressure relief mechanism into a casting itself.

7. The housing of claim 1, wherein the pressure relief mechanism is present on one of an interior and an exterior of the housing.

8. A pressure relief mechanism for a housing of a gas-filled switchgear in a gas insulated switchgear (GIS) system, the pressure relief mechanism comprising a portion of the housing having a first thickness, different from a second thickness of a remaining portion of the housing, the first thickness being less than the second thickness and the pressure relief mechanism being configured to rupture at predetermined overpressure conditions to vent bi-products of an arc fault in the GIS system, wherein the pressure relief mechanism is present on one of an interior and an exterior of the housing and, wherein the pressure relief mechanism is integrated with the housing such that the pressure relief mechanism is not installed onto or into the housing.

9. The pressure relief mechanism of claim 8, wherein the pressure relief mechanism comprises a groove having the first thickness that defines an area of the housing, the area of the housing defined by the groove configured to fail responsive to the predetermined overpressure conditions.

10. The pressure relief mechanism of claim 8, wherein the pressure relief mechanism comprises a defined area having the first thickness, the defined area being configured to fail responsive to the predetermined overpressure conditions.

11. The pressure relief mechanism of claim 8, wherein the housing comprises a cast metal housing.

12. The pressure relief mechanism of claim 8, wherein the pressure relief mechanism is integrated directly into walls of the housing by incorporating a geometry of the pressure relief mechanism into a casting itself.

13. A gas insulated switchgear (GIS) comprising:
   a gas filled housing including a pressure relief mechanism incorporated into the housing,
   wherein the pressure relief mechanism includes a portion of the housing having a first thickness, different from a second thickness of a remaining portion of the housing, the first thickness being less than the second thickness; and
   wherein the pressure relief mechanism is configured to rupture at predetermined overpressure conditions to vent bi-products of an arc fault in a GIS system.

14. The GIS of claim 13, wherein the pressure relief mechanism comprises a groove having the first thickness that defines an area of the housing, the area of the housing defined by the groove configured to fail responsive to the predetermined overpressure conditions.

15. The GIS of claim 13, wherein the pressure relief mechanism comprises a defined area having the first thickness, the defined area being configured to fail responsive to the predetermined overpressure conditions.

16. The GIS of claim 13, wherein the housing comprises a cast metal housing.

17. The GIS of claim 13, wherein the pressure relief mechanism is integrated with the housing such that the pressure relief mechanism is not installed onto or into the housing.

18. The GIS of claim 13, wherein the pressure relief mechanism is integrated directly into walls of the housing by incorporating a geometry of the pressure relief mechanism into a casting itself.

* * * * *